US009780371B2

(12) United States Patent
Chang et al.

(10) Patent No.: US 9,780,371 B2
(45) Date of Patent: *Oct. 3, 2017

(54) CATHODE ACTIVE MATERIAL AND LITHIUM SECONDARY BATTERY COMPRISING THE SAME

(71) Applicant: LG CHEM, LTD., Seoul (KR)

(72) Inventors: Sung-Kyun Chang, Daejeon (KR); Sin Young Park, Daejeon (KR); Jinhyung Lim, Daejeon (KR); Hong Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,934

(22) Filed: Feb. 28, 2013

(65) Prior Publication Data

US 2013/0177816 A1  Jul. 11, 2013

Related U.S. Application Data

(63) Continuation of application No. PCT/KR2011/006796, filed on Sep. 15, 2011.

(30) Foreign Application Priority Data

Sep. 17, 2010 (KR) ........................ 10-2010-0091342

(51) Int. Cl.
*H01M 4/525* (2010.01)
*H01M 4/131* (2010.01)
*H01M 4/36* (2006.01)
*H01M 4/505* (2010.01)
*H01M 10/052* (2010.01)
*C01G 53/04* (2006.01)
*C01G 53/00* (2006.01)

(52) U.S. Cl.
CPC ............ *H01M 4/525* (2013.01); *C01G 53/50* (2013.01); *H01M 4/131* (2013.01); *H01M 4/362* (2013.01); *H01M 4/505* (2013.01); *C01P 2002/20* (2013.01); *C01P 2004/80* (2013.01); *C01P 2006/40* (2013.01); *H01M 10/052* (2013.01)

(58) Field of Classification Search
CPC .. H01M 4/525; H01M 4/505; H01M 10/0525; H01M 4/131; H01M 4/362; B60L 11/18; C01G 53/50; C01P 2002/20; C01P 2004/08; C01P 2006/40

See application file for complete search history.

(56) References Cited

U.S. PATENT DOCUMENTS 6,660,432 B2 * 12/2003 Paulsen ................. C01G 51/42
423/596
8,394,299 B2  3/2013 Shin et al.

| 2001/0024754 | A1 | 9/2001 | Fukuzawa et al. | |
|---|---|---|---|---|
| 2003/0022063 | A1* | 1/2003 | Paulsen et al. | 429/231.3 |
| 2003/0180616 | A1 | 9/2003 | Johnson et al. | |
| 2005/0069771 | A1* | 3/2005 | Manev et al. | 429/223 |
| 2006/0134520 | A1* | 6/2006 | Ishii et al. | 429/223 |
| 2006/0233696 | A1 | 10/2006 | Paulsen | |
| 2007/0202407 | A1* | 8/2007 | Eberman et al. | 429/231.3 |
| 2007/0292761 | A1 | 12/2007 | Park | |
| 2008/0160410 | A1 | 7/2008 | Sun et al. | |
| 2008/0280205 | A1 | 11/2008 | Jiang et al. | |
| 2009/0226810 | A1* | 9/2009 | Paulsen et al. | 429/223 |
| 2010/0148115 | A1* | 6/2010 | Chang | H01M 4/505 |
| | | | | 252/182.1 |
| 2012/0097905 | A1 | 4/2012 | Chang et al. | |
| 2012/0112139 | A1 | 5/2012 | Chang et al. | |
| 2013/0065118 | A1 | 3/2013 | Chang et al. | |

FOREIGN PATENT DOCUMENTS

| CN | 101682074 A | 3/2010 |
|---|---|---|
| CN | 102668178 A | 9/2012 |
| CN | 102668179 A | 9/2012 |
| CN | 102668186 A | 9/2012 |
| CN | 102714314 A | 10/2012 |
| EP | 2 511 972 A2 | 10/2012 |
| EP | 2506342 A2 | 10/2012 |
| EP | 2506343 A2 | 10/2012 |

(Continued)

OTHER PUBLICATIONS

K-PION Machine Translation of KR 10-2009-0105868A (Oct. 2009).*
Chinese Office Action issued in Chinese Patent Application No. 201180043709.4 on May 21, 2015.
Extended European Search Report for Application No. EP11825434 dated Dec. 22, 2016.
IPDL Machine Translation of JP 11-233113A (Aug. 1999).
U.S. Appl. No. 13/529,430, filed Jun. 21, 2012 titled "Cathode Active Material and Lithium Secondary Battery Comprising the Same".
European Search Report issued in European Application No. 11825434.1 on Oct. 11, 2016.

*Primary Examiner* — Gregg Cantelmo
(74) *Attorney, Agent, or Firm* — Lerner, David, Littenberg, Krumholz & Mentlik, LLP

(57) ABSTRACT

Disclosed is a cathode active material for secondary batteries comprising one or more compounds having a layered-crystal structure, represented by the following Formula 1, wherein a transition metal layer contains Li, in an amount lower than 20%, based on a total amount of a transition metal site, and a ratio of Ni positioned in a lithium layer, that is, a cation mixing ratio is 1% to 4.5%, based on a total amount of a lithium site in the lithium layer to stably support the layered-crystal structure: $(1-s-t)[Li(Li_aMn_{(1-a-x-y)}Ni_xCo_y)O_2]*s[Li_2CO_3]*t[LiOH]$ (1), wherein $0<a<0.2$; $0<x<0.9$; $0<y<0.5$; $a+x+y<1$; $0<s<0.03$; and $0<t<0.03$. The cathode active material exhibits long lifespan and superior stability at room temperature and high temperatures in spite of repeated charge and discharge at a high current.

12 Claims, No Drawings

(56) References Cited

FOREIGN PATENT DOCUMENTS

| | | | |
|---|---|---|---|
| JP | 11233113 A | * | 8/1999 |
| JP | 2001250549 A | * | 9/2001 |
| JP | 2002128526 A | * | 5/2002 |
| JP | 2004281253 A | * | 10/2004 |
| JP | 2005327644 A | | 11/2005 |
| JP | 2008147068 A | | 6/2008 |
| KR | 20060035547 A | | 4/2006 |
| KR | 10-2007-0109854 A | | 11/2007 |
| KR | 10-2007-0109878 A | | 11/2007 |
| KR | 20070118933 A | | 12/2007 |
| KR | 20080029479 A | | 4/2008 |
| KR | 10-2009-0105868 A | * | 10/2009 |
| KR | 20090105868 A | | 10/2009 |
| KR | 10-2009-0127589 A | | 12/2009 |

* cited by examiner

CATHODE ACTIVE MATERIAL AND LITHIUM SECONDARY BATTERY COMPRISING THE SAME

CROSS REFERENCE TO RELATED APPLICATIONS

This application is a Continuation of PCT International Application No. PCT/KR2011/006796 filed on Sep. 15, 2011, which claims priority under 35 U.S.C. §119(a) to Patent Application No. 10-2010-0091342 filed in the Republic of Korea on Sep. 17, 2010, all of which are hereby expressly incorporated by reference into the present application.

TECHNICAL FIELD

The present invention relates to a cathode active material for secondary batteries and to a cathode active material for secondary batteries comprising a compound having a specific composition wherein a transition metal layer contains Li, in an amount lower than 20%, based on a total amount of a transition metal site, and a ratio of Ni positioned in a lithium layer, that is, a cation mixing ratio, in a layered-crystal structure, is 1% to 4.5%, based on a total amount of a lithium site in the lithium layer to stably support the layered-crystal structure, thereby exhibiting superior rate characteristics, long lifespan and superior stability at room temperature and high temperatures.

BACKGROUND ART

Technological development and increased demand for mobile equipment have led to a rapid increase in the demand for secondary batteries as energy sources. Among these secondary batteries, lithium secondary batteries having high energy density, driving voltage, long lifespan and low self-discharge are commercially available and widely used.

In addition, increased interest in environmental issues has brought about a great deal of research associated with electric vehicles (EVs) and hybrid electric vehicles (HEVs) as substitutes for vehicles, such as gasoline vehicles and diesel vehicles, using fossil fuels which are major causes of air pollution. Nickel metal hydride (Ni-MH) secondary batteries are generally used as power sources of electric vehicles (EVs), hybrid electric vehicles (HEVs) and the like. However, a great deal of study associated with use of lithium secondary batteries, high energy density high discharge voltage and power stability is currently underway and some are commercially available.

In particular, lithium secondary batteries used for electric vehicles should have high energy density, exhibit great power within a short time and be used for 10 years or longer under harsh conditions in which charge and discharge at a high current are repeated for a short time, thus requiring considerably superior safety and long lifespan, as compared to conventional small lithium secondary batteries.

Lithium-containing cobalt oxide ($LiCoO_2$) with a layered structure is generally used as a conventional cathode active material for small-sized lithium ion secondary batteries and use of lithium-containing manganese oxides such as $LiMnO_2$ having a layered-crystal structure and $LiMn_2O_4$ having a spinel-crystal structure, and lithium-containing nickel oxide ($LiNiO_2$) is also considered. Of these cathode active materials, $LiCoO_2$ is the most generally used due to superior lifespan characteristics and charge/discharge efficiency, but has disadvantages of low structural stability and limited price competitiveness due to high price caused by resource limitation of cobalt used as a raw material.

Lithium manganese oxides such as $LiMnO_2$ and $LiMn_2O_4$ have advantages of superior thermal safety and low cost, but have disadvantages of low capacity and poor high-temperature characteristics.

In addition, $LiNiO_2$-based cathode active materials exhibit high battery discharge capacity, but have disadvantages in that it is considerably difficult to synthesize $LiNiO_2$-based cathode active materials through simple solid phase reaction, essential dopants are required and rate characteristics are poor.

DISCLOSURE

Technical Problem

Therefore, the present invention has been made to solve the above and other technical problems that have yet to be resolved.

As a result of a variety of extensive and intensive studies and experiments, the present inventor developed a cathode active material that has a stable crystal structure based on a specific composition and cation mixing and thus exhibits superior cycle characteristics and discovered that, when secondary batteries are fabricated using the active material, the active material contributes to improvement in battery stability and thus improves performance characteristics such as lifespan. The present invention has been completed, based on this discovery.

Technical Solution

In accordance with one aspect of the present invention, provided is a cathode active material for secondary batteries comprising one or more compounds having a layered-crystal structure, represented by the following Formula 1, wherein a transition metal layer contains Li, in an amount lower than 20%, based on a total amount of a transition metal site, and a ratio of Ni positioned in a lithium layer, that is, a cation mixing ratio, in the layered-crystal structure, is 1% to 4.5%, based on a total amount of a lithium site in the lithium layer to stably support the layered-crystal structure.

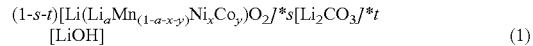

$(1-s-t)[Li(Li_aMn_{(1-a-x-y)}Ni_xCo_y)O_2]*s[Li_2CO_3]*t[LiOH]$     (1)

wherein 0<a<0.2; 0<x<0.9; 0<y<0.5; a+x+y<1; 0<s<0.03; and 0<t<0.03, and a, x and y represent molar ratios, and s and t represent weight ratios.

As described above, the cathode active material of the present invention has a layered structure and a composition comprising specific elements and compounds, lithium ions are intercalated and deintercalated between a mixed transition metal oxide layer ("transition metal layer"), a part of Ni ions derived from the transition metal layer are inserted into an intercalation and deintercalation layer ("lithium layer") of the lithium ions to bond transition metal layers, and the transition metal layer contains a predetermined amount of lithium.

A conventional lithium mixed transition metal oxide has a problem in which, when lithium ions are deintercalated from the lithium layer during charge, crystal structures expand and become unstable due to repulsion force between oxygen atoms of a transition metal layer and the crystal structures are changed through repeated charge/discharge, and capacity and cycle characteristics are disadvantageously sharply decreased.

On the other hand, in accordance with the cathode active material according to the present invention, nickel partially inserted into the lithium layer connects transition metal layers to one another to stabilize a crystal structure, thus preventing collapse of the crystal structure caused by intercalation and deintercalation of lithium. Accordingly, the cathode active material avoids additional structure collapse caused by separation of oxygen and further generation of $Ni^{2+}$, improving lifespan characteristics and safety, greatly enhancing battery capacity and cycle characteristics, and providing desirable rate characteristics.

That is, although lithium is deintercalated during charge, an oxidation number of Ni ions inserted into the lithium layer is maintained, collapse of crystal structures is not generated and a well-grown layered structure can thus be maintained. The battery fabricated using the cathode active material having these properties exhibits high capacity and superior cycle stability.

Furthermore, the lithium mixed transition metal oxide according to the present invention can stably maintain a crystal structure even after sintering at a relatively high temperature, thus exhibiting superior thermal stability.

Also, the lithium mixed transition metal oxide according to the present invention comprises a transition metal layer that contains a predetermined amount of lithium. This contributes to superior rate characteristics.

For practical application of batteries for electric vehicles, hybrid electric vehicles and the like which are being developed now, cycle characteristics as well as rate characteristics for increasing power are considerably important. However, active materials for batteries are basically based on reaction entailing movement of electrons and ions, and it is difficult to satisfy these requirements by simple combination and composition.

On the other hand, the lithium mixed transition metal oxide of the present invention can satisfy these requirements through Li present in the transition metal layer and transition metals present in the lithium layer.

Furthermore, the lithium transition metal oxide according to the present invention contains a predetermined amount of lithium carbonate and lithium hydroxide. The lithium carbonate and the lithium hydroxide induce HF which is a strong acid that may be present in the battery, toward the compound of Formula 1, thus inhibiting side-reactions of HF, contributing to improvement stability of the battery and improving lifespan. This is contrary to a conventional idea that lithium carbonate and lithium hydroxide do not remain as impurities in the active materials. The present invention completely reverses this conventional idea.

In Formula 1, as defined above, a is higher than 0 and lower than 0.2, preferably 0.01 to 0.19. In Formula 1, as defined above, x is higher than 0 and lower than 0.9, preferably not lower than 0.3 and lower than 0.8. In addition, in Formula 1, as defined above, y is greater than 0 and less than 0.5, preferably greater than 0 and not higher than 0.3.

The lithium carbonate and the lithium hydroxide, as defined above, are present in an amount lower than 0.03, with respect to the weight of the total active material. When the content of lithium carbonate or lithium hydroxide is excessively high, battery capacity may be disadvantageously deteriorated. In addition, when the content of the lithium carbonate or lithium hydroxide is excessively low, lifespan characteristics may be disadvantageously deteriorated. For these reasons, the lithium carbonate and the lithium hydroxide may be present in 0.001 to 0.03, with respect to the weight of the total active material. A ratio of the lithium carbonate and the lithium hydroxide is also considerably important and can be realized through control after a synthesis process.

In the present invention, the cation mixing ratio means a ratio of Ni with respect to the total weight of the lithium site in the lithium layer of the layered crystal structure and is preferably 1% to 4.5%.

When the cation mixing ratio is higher than the range defined above, serious deterioration in capacity may occur, and when the cation mixing ratio is lower than the range defined above, desired structural stability cannot be obtained and improvement in cycle characteristics may not be obtained. More preferably, the cation mixing ratio may be 1.5% to 4%.

In a preferred embodiment, the transition metal may be substituted by a metal or non-metal that may have a 6-coordination structure within the predetermined amount range. A substitution amount of the metal or non-metal that may have 6-coordination structure is preferably 10 mol % or less, based on the total weight of the transition metal. When the substitution amount is excessively high, acquisition of the desired level of capacity may be disadvantageously difficult. Examples of the metal or non-metal include, but are not limited to Cr, Fe, V, Zr, Al, Mg, B and the like.

In some cases, in Formula 1, oxygen (O) ions may be substituted by other anions within a predetermined range. The other anion is preferably one or two or more elements selected from the group consisting of halogens such as F, Cl, Br and I, sulfur, chalcogenide compounds and nitrogen, but is not limited thereto.

Advantageously, the substitution of the anions improves bonding force with transition metals and prevents structural transition of the active material. When the substitution amount of the anions is excessively high, the compound cannot maintain a stable structure and lifespan may thus be deteriorated. Accordingly, the substitution amount of the anions is 0.2 mole or less, more preferably 0.01 to 0.1 mole.

In the cathode active material according to the present invention, Ni present in the lithium layer is preferably $Ni^{2+}$ derived from the transition metal layer. $Ni^{2+}$ can be inserted into the lithium site of the lithium layer, since $Ni^{2+}$ has a similar size to $Li^+$.

The compound of Formula 1 constituting the cathode active material of the present invention may be prepared, based on the formula above. For example, the compound of Formula 1 may be prepared by calcinizing a mixture of a lithium precursor and a transition metal precursor under an oxygen-containing atmosphere. The lithium precursor may be lithium carbonate, lithium hydroxide or the like and the transition metal precursor may be a transition metal oxide, a transition metal hydroxide or the like. The transition metal precursor may be a mixture of the respective transition metal precursors or a single precursor comprising the respective transition metals. The latter mixed precursor may be prepared by co-precipitation or the like.

The cathode active material according to the present invention may be prepared using a cathode mix containing a conductive material and a binder.

The cathode of the present invention may be fabricated by preparing a slurry containing a predetermined solvent such as water or NMP and applying the slurry to a current collector, followed by drying and rolling.

The cathode may be fabricated by adding a mix comprising a binder, an electrode active material and a conductive material to a predetermined solvent such as water or NMP to prepare a slurry and applying the slurry to the collector, followed by drying. The mixture (cathode mix) of the cathode active material, conductive material, binder and the like may further comprise at least one component selected from the group consisting of a viscosity controller and a filler, if necessary.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, the current collector may also be processed to form fine irregularities on the surface thereof so as to enhance adhesion to the cathode active materials. In addition, the current collectors may be used in various forms including films, sheets, foils, nets, porous structures, foams and non-woven fabrics.

The conductive material improves conductivity of the electrode active material and is commonly added in an amount of 0.01 to 30% by weight, based on the total weight of the electrode mix. Any conductive material may be used without particular limitation so long as it has suitable conductivity without causing adverse chemical changes in the fabricated secondary battery. Examples of the conductive materials that can be used in the present invention include graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which enhances binding of an active material to a conductive material and a current collector. The binder is commonly added in an amount of 1 to 50% by weight, based on the total weight of the mixture including the anode active material. Examples of the binder include polyfluorovinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubbers, fluoro rubbers and various copolymers.

The viscosity controller controls the viscosity of the electrode mix so as to facilitate mixing of the electrode mix and application thereof to the collector and may be added in an amount of 30% by weight or less, based on the total weight of the electrode mix. Examples of the viscosity controller include, but are not limited to, carboxymethylcellulose, polyacrylic acid and polyvinylidene fluoride. If necessary, the solvent may also serve as a viscosity controller.

The filler is an adjuvant component optionally used to inhibit expansion of the cathode. There is no particular limit as to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

The cathode may be used for fabrication of a lithium secondary battery together with the cathode, an anode, a separator and a lithium salt-containing non-aqueous electrolyte.

The anode is, for example, fabricated by applying an anode active material to an anode current collector, followed by drying. If desired, the anode may further optionally include other components such as a conductive material, a binder and a filler, as described above.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, the anode current collector may be processed to form fine irregularities on the surface thereof so as to enhance adhesion to the anode active materials. In addition, the current collector may be used in various forms including films, sheets, foils, nets, porous structures, foams and non-woven fabrics.

Examples of the anode active material include carbon and graphite materials such as natural graphite, artificial graphite, expanded graphite, carbon fibers, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material or a silicon-carbon-based active material is more preferred. The material may be used alone or in combination of two or more thereof.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and the electrolyte.

The lithium salt-containing non-aqueous electrolyte is composed of a non-aqueous electrolyte and lithium. As the non-aqueous electrolyte, a non-aqueous electrolyte solution, an organic solid electrolyte and an inorganic solid electrolyte may be utilized.

Examples of the non-aqueous electrolyte solution that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention include polyethylene derivatives, polyethylene oxide derivatives, polypropylene oxide derivatives, phosphoric acid ester polymers, poly agitation lysine, poly-ester sulfide, polyvinyl alcohol, polyvinylidene fluoride, and polymers containing ionic dissociation groups.

Examples of the inorganic solid electrolyte utilized in the present invention include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS), fluoro-propylene carbonate (FPC) and the like.

The secondary battery according to the present invention is preferably used for battery cells serving as a power source of small-sized devices and as a unit battery for middle- and large-sized battery modules including a plurality of battery cells used as a power source of middle- and large-sized devices requiring high-temperature stability, long cycle characteristics and superior rate characteristics.

Preferably, examples of middle- and large-sized devices include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes) and electric scooters (E-scooters); electric golf carts and the like.

BEST MODE

Now, the present invention will be described in more detail with reference to the following examples. These examples are provided only to illustrate the present invention and should not be construed as limiting the scope and spirit of the present invention.

Example 1

A precursor was synthesized such that a molar ratio of Ni:Mn:Co was 53:27:20 and mixed with $Li_2CO_3$, and an active material of $0.9978Li(Li_{0.02}(Ni_{0.53}Mn_{0.27}Co_{0.20})_{0.98})O_2*0.0012LiOH*0.0010Li_2CO_3$ was prepared at a furnace temperature of 940° C. under a controlled cooling atmosphere.

The amounts of LiOH and $Li_2CO_3$ in the product were measured by adding 10 g of the active material to 200 ml of water and measuring an amount of the base by titration with 0.1N HCl.

Comparative Example 1

An active material of $0.9948Li(Li_{0.02}(Ni_{0.78}Mn_{0.12}Co_{0.10})_{0.98})O_2*0.0052Li_2CO_3$ was prepared in the same manner as in Example 1, except that an amount of carbonate was maximized by controlling the cooling atmosphere.

Comparative Example 2

An active material was prepared in the same manner as in Example 1, except that an amount of Li in the transition metal layer was zero.

Comparative Example 3

An active material was prepared in the same manner as in Example 1, except that Li was not present in the transition metal layer and a ratio of Li and transition metal was 1:0.99.

Comparative Example 4

An active material was prepared in the same manner as in Example 1, except that Li was not present in the transition metal layer and a ratio of Li and the transition metal was 0.97.

Example 2

An active material of $0.9972Li(Li_{0.02}(Ni_{0.53}Mn_{0.27}Co_{0.20})_{0.98})O_2*0.0018LiOH*0.0010Li_2CO_3$ was prepared in the same manner as in Example 1, except that an amount of OH was increased by controlling the cooling atmosphere.

Example 3

An active material of $0.9972Li(Li_{0.02}(Ni_{0.53}Mn_{0.27}Co_{0.20})_{0.98})O_2*0.0008LiOH*0.0020Li_2CO_3$ was prepared in the same manner as in Example 1, except that an amount of OH was increased by controlling the cooling atmosphere.

Comparative Example 5

The active material was washed with distilled water to remove the base of the active material prepared in Example 1 and dried in an oven at 130° C. for 24 hours to prepare $Li(Li_{0.02}(Ni_{0.53}Mn_{0.27}Co_{0.20})_{0.98})O_2$.

Example 4

A precursor was synthesized such that a molar ratio of Ni:Mn:Co was 78:12:10 and mixed with $Li_2CO_3$, and an active material of $0.9952Li(Li_{0.02}(Ni_{0.78}Mn_{0.12}Co_{0.10})_{0.98})O_2*0.0026LiOH*0.0022Li_2CO_3$ was prepared at a furnace temperature of 890° C. under a controlled cooling atmosphere.

The amounts of LiOH and $Li_2CO_3$ in the product were measured by adding 10 g of the active material to 200 ml of water and measuring an amount of the base by titration with 0.1N HCl.

Comparative Example 6

An active material of $0.9948Li(Li_{0.02}(Ni_{0.78}Mn_{0.12}Co_{0.10})_{0.98})O_2*0.0052Li_2CO_3$ was prepared by treating the precursors of Example 4 and $Li_2CO_3$ in the same manner as in Comparative Example 1.

Comparative Example 7

An active material was prepared in the same manner as in Example 4, except that an amount of Li in the transition metal layer was zero.

Comparative Example 8

An active material was prepared in the same manner as in Example 4, except that Li was not present in the transition metal layer and a ratio of Li and the transition metal was 1:0.99.

Comparative Example 9

An active material was prepared in the same manner as in Example 4, except that Li was not present in the transition metal layer and a ratio of Li and the transition metal was 1:0.97.

Comparative Example 10

An active material of $Li(Li_{0.02}(Ni_{0.78}Mn_{0.12}Co_{0.10})_{0.98})O_2$ was prepared by treating the active material prepared in Example 4 in the same manner as in Comparative Example 5.

Example 5

A precursor was synthesized such that a molar ratio of Ni, Mn and Co was 50:40:10 and mixed with $Li_2CO_3$, and an active material of $0.9967Li(Li_{0.1}(Ni_{0.5}Mn_{0.4}Co_{0.1})_{0.9})O_2*0.0021LiOH*0.0012Li_2CO_3$ was prepared at a furnace temperature of 950° C. under a controlled cooling atmosphere.

The amounts of LiOH and $Li_2CO_3$ in the product were measured by adding 10 g of the active material to 200 ml of water and measuring an amount of the base by titration with 0.1N HCl.

Comparative Example 11

An active material of $0.9966Li(Li_{0.1}(Ni_{0.5}Mn_{0.4}Co_{0.1}))O_2*0.0034Li_2CO_3$ was prepared by treating the precursors of Example 5 and $Li_2CO_3$ in the same manner as in Comparative Example 1.

Comparative Example 12

An active material of $Li(Li_{0.1}(Ni_{0.5}Mn_{0.4}Co_{0.1}))O_2$ was prepared by treating the active material prepared in Example 5 in the same manner as in Comparative Example 5.

Experimental Example 1

The active materials synthesized in Examples 1 to 5 and Comparative Examples 1 to 12, a conductive material and a binder were mixed at a ratio of active material:conductive material:binder of 95:2.5:2.5 to prepare a slurry and the slurry was coated on an Al foil. The obtained electrode was pressed at a porosity of 23% and punched into a circular shape to fabricate a coin-type battery. At this time, Li metal was used for the anode, and a solution of 1M $LiPF_6$ in a solvent mixed at a ratio of EC:DMC:DEC of 1:2:1 was used as an electrolyte. The fabricated batteries were subjected to a variety of tests under the conditions shown in Table 1 below.

In addition, data of active materials synthesized in Examples 1 to 5 and Comparative Examples 1 to 12 were obtained by X-ray diffraction analysis and an amount of transition metal in the structure was determined by structural refinement.

These results are shown in Table 1 below.

TABLE 1

| Electrochemical test results | | | | | |
|---|---|---|---|---|---|
| | Discharge capacity (mAh/g) | $1^{st}$ cycle efficiency (%) | Rate capability 2.0 C/0.1 C (%) | Cycle capability $30^{th}$ cycle/$1^{st}$ cycle (%) | Ni Occ. In Li site (%) |
| Ex. 1 | 163 | 88 | 85 | 95 | 2.4 |
| Comp. Ex. 1 | 158 | 85 | 78 | 89 | 3.0 |
| Comp. Ex. 2 | 154 | 82 | 74 | 90 | 5.2 |
| Comp. Ex. 3 | 152 | 80 | 75 | 88 | 6.0 |
| Comp. Ex. 4 | 145 | 80 | 71 | 85 | 6.7 |
| Ex. 2 | 164 | 89 | 86 | 94 | 2.6 |
| Ex. 3 | 161 | 87 | 84 | 92 | 2.8 |
| Comp. Ex. 5 | 165 | 89 | 85 | 82 | 2.5 |
| Ex. 4 | 195 | 89 | 84 | 92 | 1.9 |
| Comp. Ex. 6 | 189 | 86 | 79 | 87 | 2.2 |
| Comp. Ex. 7 | 186 | 85 | 73 | 90 | 4.7 |
| Comp. Ex. 8 | 178 | 82 | 68 | 89 | 7.3 |
| Comp. Ex. 9 | 170 | 82 | 66 | 88 | 9.2 |
| Comp. Ex. 10 | 196 | 90 | 85 | 80 | 2.1 |
| Ex. 5 | 159 | 91 | 87 | 97 | 2.4 |
| Comp. Ex. 11 | 149 | 87 | 78 | 89 | 2.6 |
| Comp. Ex. 12 | 160 | 91 | 86 | 85 | 3.0 |

As can be seen from Table 1 above, LiOH and $Li_2CO_3$ play an important role in the active material. In Comparative Examples 5, 10 and 12 in which LiOH and $Li_2CO_3$ are not present in respective active materials, rate and cycle characteristics are sharply decreased. Variation in these characteristics increases 10 to 15 fold, when actual battery cycles, i.e., 300 or 500 cycles, of the active material are repeated and, in particular, this increase becomes more severe when applied to batteries for electric vehicles. In addition, as can be seen from the results of Comparative Examples 1, 6 and 11, performance is deteriorated in a case in which $Li_2CO_3$ is present alone.

Furthermore, comparing the results of Example 1 and Comparative Examples 2 to 4 with the results of Example 4 and Comparative Examples 7 to 9, depending on presence of Li in the transition metal layer, the examples according to the present invention exhibit considerably superior rate characteristics, as compared to Comparative Examples.

Accordingly, the cathode active materials of the present invention exhibit superior lifespan and rate characteristics.

INDUSTRIAL APPLICABILITY

As can be seen from above, the cathode active material having a crystal structure according to the present invention can secure stability of secondary batteries and improve lifespan under rapid high-current charge/discharge conditions and high temperature conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material for secondary batteries comprising one or more compounds having a layered-crystal structure, represented by the following Formula 1, wherein a transition metal layer contains Li, in an amount lower than 20%, based on a total amount of a transition metal site, and an amount of Ni positioned in a lithium layer is 1.5% to 4.0%, based on a total amount of lithium sites in the lithium layer to stably support the layered-crystal structure, and wherein a lithium secondary battery comprising the cathode active material exhibits a cycle capability of 92% to 97% after the 30$^{th}$ cycle compared to the 1$^{st}$ cycle:

$$(1-s-t)[\text{Li}(\text{Li}_a(\text{Mn}_{(1-a-x-y)}\text{Ni}_x\text{Co}_y)_{1-a})\text{O}_2]*s[\text{Li}_2\text{CO}_3]*t[\text{LiOH}] \quad (1)$$

wherein $0<a<0.2$; $0<x<0.9$; $0<y<0.5$; $a+x+y<1$; $0.0010 \leq s < 0.0022$, $0.0012 \leq t < 0.0026$, $0.0022 \leq s+t < 0.0048$, and a, x and y represent molar ratios, and s and t represent weight ratios.

2. The cathode active material according to claim 1, wherein a is 0.01 to 0.19.

3. The cathode active material according to claim 1, wherein x is not lower than 0.3 and is lower than 0.8.

4. The cathode active material according to claim 1, wherein y is greater than 0 and is not higher than 0.3.

5. The cathode active material according to claim 1, wherein the transition metal is substituted in a predetermined amount by a metal or non-metal element having a 6-coordination structure.

6. The cathode active material according to claim 5, wherein a substitution amount of the metal or non-metal element having a 6-coordination structure is 10 mol % or less, based on the total weight of the transition metal.

7. The cathode active material according to claim 1, wherein Ni positioned in the lithium layer is Ni$^{2+}$ derived from the transition metal layer.

8. A cathode mix comprising the cathode active material according to claim 1.

9. A cathode for secondary batteries in which the cathode mix according to claim 8 is applied to a current collector.

10. A lithium secondary battery comprising the cathode for secondary batteries according to claim 9.

11. A middle- or large-sized battery pack comprising the secondary battery according to claim 10 as a unit battery.

12. An electric vehicle, a hybrid electric vehicle or a plug-in hybrid electric vehicle comprising the middle- or large-sized battery pack of claim 11.

* * * * *